(No Model.)
J. A. BUTTON.
BEER DRAWING APPARATUS.
No. 326,017. Patented Sept. 8, 1885.
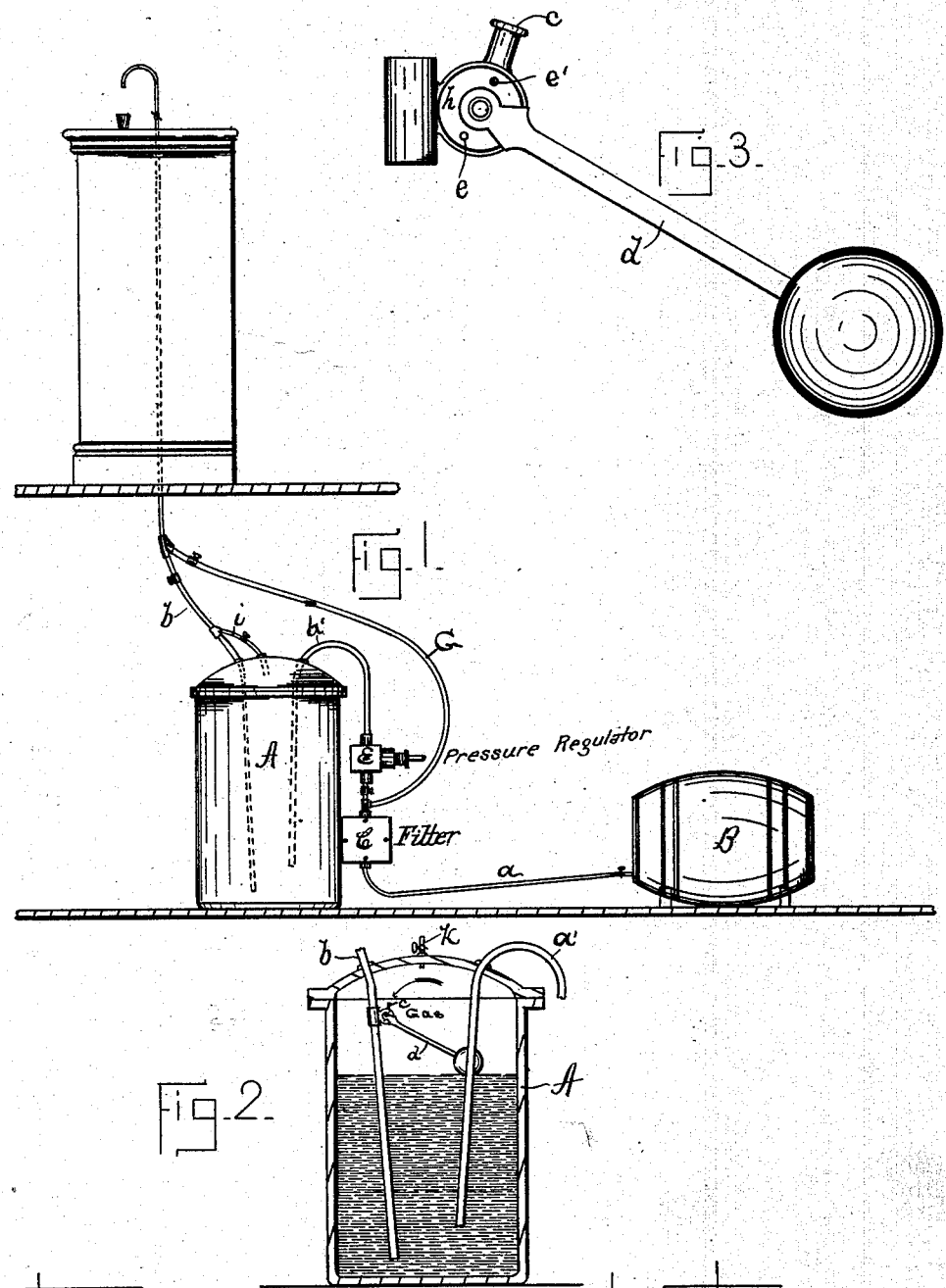

UNITED STATES PATENT OFFICE.

JOHN A. BUTTON, OF NORWICH, CONNECTICUT.

BEER-DRAWING APPARATUS.

SPECIFICATION forming part of Letters Patent No. 326,017, dated September 8, 1885.

Application filed June 19, 1885. (No model.)

*To all whom it may concern:*

Be it known that I, JOHN A. BUTTON, a citizen of the United States, residing at Norwich, New London county, Connecticut, have made certain new and useful Improvements in Beer-Drawing Apparatus, which improvements are fully set forth and described in the following specification, reference being had to the accompanying drawings.

My invention relates to that class of devices by means of which beer or other analogous liquids are drawn direct from the barrel, my object being to so improve such apparatus that the liquid drawn shall be delivered under a uniform pressure and free from all sediment or impurities. It is also my purpose to so improve the pressure-chamber that the gas which collects therein may be automatically disposed of.

In the annexed drawings, Figure 1 shows my complete device as it appears when in use. Fig. 2 is a vertical sectional view, somewhat enlarged, of the chamber A, showing the means which I have provided to automatically dispose of the gas which naturally collects in said chamber; and Fig. 3 is an enlarged detached view of the ball-cock shown in said Fig. 2.

Referring to Fig. 1, the letter A represents a chamber of cylindrical or other suitable form, and B the barrel from which the liquid is to be drawn. At convenient points between said cylinder and barrel I have located a filter, C, and a pressure-regulator, E, both being in the line of pipe $a$, which forms the connection between the cylinder and barrel. The filter C, I form, preferably, as a simple box, one of whose sides may be removed for frequent cleaning, and in said box I arrange a packing of sponge, which material I find in practice removes all sediment without materially diminishing the pressure.

The pressure-regulator E, I prefer to locate between the filter and cylinder A, as there is less tendency to clog after the liquid has been filtered. This pressure-regulator E, although forming an element of the combination of devices which I claim as my invention, is not claimed by me broadly, and I have therefore thought it unnecessary to describe said regulator in detail.

Any of the pressure-regulators or balanced valves for liquids now in common use may be used here with equally good results, my object being to reduce the head or pressure to a desired point before the liquid enters cylinder A, and to hold it at said point, even though the pressure in the barrel is gradually reduced as the liquid is drawn out.

The inlet-pipe $a'$ reaches well downward into the cylinder A, discharging its contents near the bottom of said cylinder.

It will now be understood that the ale, beer, or other liquid as it leaves the barrel passes through pipe $a$ to the filter, where all pieces of hops and other sediment are removed. From the filter it passes to the regulator E, where the pressure is checked and reduced to the desired point for drawing, at which pressure it enters cylinder A. $b$ represents an outlet or discharge pipe leading from the bottom of cylinder A to the counter; or, if preferred, an ordinary beer-pump may be attached at the delivery end.

I find in practice that by introducing the liquid at or near the bottom of the cylinder the volume of liquid as it accumulates in said cylinder acts to clear that which is constantly flowing in, as the froth, which naturally rises, is separated into its constituent elements—liquid and gas—the gas accumulating in the dome of the cylinder, and the liquid returning to the body of liquid, ready for drawing much sooner than if the pipe $a'$ discharged its contents into the upper portion of cylinder A. By extending the outlet or discharge pipe $b$ nearly to the bottom of the cylinder the liquid drawn is always taken from the settled liquid, and the froth usually encountered is entirely avoided.

To remove the gas which after a time collects in the dome of the cylinder, I provide, preferably, a ball-float cock such as I have shown at $c$ in Figs. 2 and 3, said gas-discharge cock being connected either directly to the outlet-pipe $b$ or to an independent pipe leading outward to the air. When said ball-cock is allowed to move downward by the lowering of the liquid in the cylinder, the lever-arm $d$ engages a pin or stud, $e$, on the valve-plate $h$, causing said plate to rotate a distance sufficient to open the cock and allow the collected gas to escape. The liquid immediately rushes in to fill the space before occupied by said gas, and the ball-float gradually rises until the lever-arm engages pin $e'$ and closes the gas-discharge cock.

In cases where it is desirable or necessary to relieve the gas-pressure without waiting for the float to act, I provide a simple cock, $k$, or a branch, $i$, leading into the pipe $b$.

At G, I have shown a branch which leads from the filter direct to the outlet-pipe $b$, so that when it is desired to draw a large quantity of liquid—as, for instance, a pailful or more—it may be done without drawing through the cylinder A. In the accompanying drawings I have shown the cylinder A and barrel as located below the floor of the saloon; but they may, if preferred, be placed immediately under the counter.

My improved apparatus, although described as used for drawing beer or ale, is equally valuable for controlling and reducing the pressure or head of water when supplied from reservoirs, tanks, &c. In such cases a considerable body of water is accumulated and held in reserve under reduced pressure in the cylinder A. Several service-pipes may lead outward from said cylinder to any desired points; or a single large pipe may be used.

Having thus described my invention, I claim as new and wish to secure by Letters Patent—

1. The within-described beer-drawing apparatus, consisting of the barrel B, filter C, pressure-regulator E, cylinder A, and a pipe or pipes connecting said elements with each other, and a suitable outlet-pipe leading from said cylinder, all being combined substantially as described, and for the several objects set forth.

2. In combination with the barrel B, filter C, pressure-regulator E, and cylinder A, a pipe connecting said elements and extending nearly to the bottom of said cylinder, an outlet-pipe for the liquid, and a ball-float cock so connected with a gas-discharge pipe that it acts to relieve the gas-pressure and allow the liquid to enter the cylinder, all being substantially as described, and for the objects set forth.

JOHN A. BUTTON.

Witnesses:
FRANK H. ALLEN,
TYLER J. HOWARD.